United States Patent

Motoyama

[11] Patent Number: 5,922,967
[45] Date of Patent: Jul. 13, 1999

[54] METHOD AND APPARATUS FOR ESTIMATING LOADS IMPOSED ON STRUCTURAL BODY

[75] Inventor: Keiichi Motoyama, Wako, Japan

[73] Assignee: Honda Giken Kogyo Kabushiki Kaisha, Tokyo, Japan

[21] Appl. No.: 08/934,419

[22] Filed: Sep. 19, 1997

[30] Foreign Application Priority Data

Sep. 20, 1996 [JP] Japan ................................ 8-249838

[51] Int. Cl.$^6$ ................................................. G01N 3/00
[52] U.S. Cl. ...................... 73/794; 73/772; 73/862.044
[58] Field of Search ........................... 73/767, 772, 794, 73/819, 862.043, 862.044

[56] References Cited

U.S. PATENT DOCUMENTS

| | | | |
|---|---|---|---|
| 4,488,441 | 12/1984 | Ramming | 73/862 |
| 4,493,220 | 1/1985 | Carignan et al. | 73/862 |
| 4,640,139 | 2/1987 | Fritz | 73/862 |
| 4,671,118 | 6/1987 | Hatamura | 73/862 |
| 5,461,933 | 10/1995 | Ives et al. | 73/862.623 |
| 5,500,509 | 3/1996 | Vogt | 73/862.623 |
| 5,668,325 | 9/1997 | Hart et al. | 73/819 |
| 5,723,792 | 3/1998 | Miyazakai | 73/819 |

*Primary Examiner*—Max H. Noori
*Attorney, Agent, or Firm*—Lyon & Lyon LLP

[57] ABSTRACT

A plurality of strain gages are installed on a structural body at n positions thereon. A concentrated reference load is applied to the structural body at one of the n positions and strains developed in the structural body at the respective n positions are measured when the concentrated reference load is applied to the structural body. The measured deformations are divided by the concentrated load reference to produce strains per unit load. The above process is repeated at each of the n positions to generate the practical equations given below:

$$\kappa 11 \cdot A1 + \kappa 12 \cdot A2 \cdots + \kappa 1n \cdot An = \varepsilon 1$$

$$\kappa 21 \cdot A1 + \kappa 22 \cdot A2 \cdots + \kappa 2n \cdot An = \varepsilon 2$$

$$\vdots$$

$$\kappa n1 \cdot A1 + \kappa n2 \cdot A2 \cdots + \kappa nn \cdot An = \varepsilon n$$

where $\kappa 11 \sim \kappa nn$ represent strains per unit load, $A1 \sim An$ represent estimated loads (unknowns), and $\varepsilon 1 \sim \varepsilon n$ represent measured strain data. Then n measured strain data are collected from the strain gages while the structural body is in operation and estimated loads are calculated from the collected n measured strain data according to the practical equations, whereby loads applied to the structural body at the respective n positions can be estimated in real-time.

12 Claims, 4 Drawing Sheets

METHOD AND APPARATUS FOR ESTIMATING LOADS IMPOSED ON STRUCTURAL BODY

BACKGROUND OF THE INVENTION

1. Field of the Invention

The present invention relates to a method of estimating loads imposed on a structural body based on measured strains or flexures of the structural body that are caused by applied loads.

2. Prior Art

There has been known a method of estimating a load imposed on a structural body by attaching a strain measuring device such as a strain gage to the structural body, directly measuring a strain of the structural body where the strain gage is applied, determining a stress from the measured strain, and estimating a load acting on the structural body from the determined stress.

When an axial force is applied to a column having a simple shape, the following equation is satisfied:

$$E = \sigma/\epsilon = (P/A)/(\lambda/1)$$

where E represents the modulus of longitudinal elasticity of the load, ($\sigma$ the simple vertical stress of the rod, $\epsilon$ the longitudinal strain of the rod, P the axial load imposed on the rod, A the cross-sectional area of the rod, $\lambda$ the extension or compression of the rod, and 1 the original length of the rod.

However, actual structural bodies do not have a uniform cross-sectional shape. Loads are applied to actual structural bodies in complex directions and at plural points thereon. Therefore, although strains of actual structural bodies caused by loads applied thereto can be measured, it is almost impossible to convert the measured strains into the applied loads.

One solution is to carry out a computer simulation process on a structural body rather than measuring developed strains of the structural body. It is, however, not reliable enough to estimate applied loads through calculations according to the computer simulation process because calculated results tend to differ widely depending on how the structural body is modeled and it is difficult to assume loading conditions. In addition, since the computer simulation process is supposed to estimate loads while the structural body is being designed, it imposes limitations on efforts to determine loads which will, be applied when the structural body is in actual use.

It would be highly beneficial for aircraft design and safety management purposes if the magnitude of loads applied to various parts of an aircraft main wing can be determined in actual flight.

Specifically, even if a number of strain gages are attached to various parts of an aircraft main wing, they produce only signals indicative of strains of those parts, providing a basis to determine whether the strains are less than allowable levels or not. The strain gages alone fail to determine the magnitude of loads applied to the various parts of the aircraft main wing.

SUMMARY OF THE INVENTION

It is therefore an object of the present invention to provide a method of estimating loads imposed on a structural body based on strains measured by a plurality of strain gages on the structural body or flexures measured by a plurality of flexure gages on the structural body.

According to an aspect of the present invention, there is provided a method of estimating loads applied to a structural body at respective n positions thereon, comprising the steps (a) installing a plurality of deformation measuring elements on the structural body respectively at the n positions, (b) applying a concentrated reference load to the structural body at one of the n positions, (c) measuring deformations developed in the structural body at the respective n positions when the concentrated reference load is applied to the structural body, (d) dividing the measured deformations by the concentrated reference load to produce deformations per unit load, (e) repeating the steps (b), (c), (d) to generate practical equations given below:

$$\kappa 11 \cdot A1 + \kappa 12 \cdot A2 \cdots + \kappa.1n \cdot An = \varepsilon 1$$

$$\kappa 21 \cdot A1 + \kappa 22 \cdot A2 \cdots + \kappa 2n \cdot An = \varepsilon 2$$

$$\vdots$$

$$\kappa n1 \cdot A1 + \kappa n2 \cdot A2 \cdots + \kappa nn \cdot An = \varepsilon n$$

where $\kappa 11 \sim \kappa nn$ represent deformations per unit load, A1 An represent estimated loads (unknowns), and $\epsilon 1 \sim \epsilon n$ represent measured deformation data, (f) collecting n measured deformation data from the deformation measuring elements while the structural body is in operation, and (g) calculating estimated loads from the collected n measured deformation data according to the practical equations, whereby loads applied to the structural body at the respective n positions can be estimated in real-time.

According to another aspect of the present invention, there is provided a method of estimating a distribution of loads applied to a structural body at respective n positions thereon from n deformation data at the n positions, comprising the steps (a) applying reference loads successively to the structural body at the respective n positions, (b) collecting deformation data from respective deformation measuring elements mounted on the structural body at the respective n positions each time one of the reference loads is applied to the structural body at one of the n positions, (c) dividing the collected deformation data by the reference loads to produce deformation data per unit load to generate practical equations given below:

$$\kappa 11 \cdot A1 + \kappa 12 \cdot A2 \cdots + \kappa 1n \cdot An = \varepsilon 1$$

$$\kappa 21 \cdot A1 + \kappa 22 \cdot A2 \cdots + \kappa 2n \cdot An = \varepsilon 2$$

$$\vdots$$

$$\kappa n1 \cdot A1 + \kappa n2 \cdot A2 \cdots + \kappa nn \cdot An = \varepsilon n$$

where $\kappa 11 \sim \kappa nn$ represent deformations per unit load, A1~An represent estimated loads (unknowns), and $\epsilon 1 \sim \epsilon n$ represent measured deformation data, (d) collecting n measured deformation data from the deformation measuring elements while the structural body is in operation, and (e) calculating estimated loads from the collected n measured deformation data according to the practical equations, whereby loads applied to the structural body at the respective n positions can be estimated in real-time.

According to still another aspect of the present invention, there is provided a method of estimating loads applied to a structural body, comprising the steps (a) applying reference loads successively to the structural body at n spaced positions thereon, (b) obtaining deformation data of the structural body from the respective n positions each time one of the reference loads is applied to the structural body at one of the n positions, (c) dividing the obtained deformation data by the reference loads to produce deformation data per unit load to generate practical equations given below:

$$\kappa 11 \cdot A1 + \kappa 12 \cdot A2 \cdots + \kappa 1n \cdot An = \varepsilon 1$$

$$\kappa 21 \cdot A1 + \kappa 22 \cdot A2 \cdots + \kappa 2n \cdot An = \varepsilon 2$$

$$\vdots$$

$$\kappa n1 \cdot A1 + \kappa n2 \cdot A2 \cdots + \varepsilon nn \cdot An = \kappa n$$

where κ11~κnn represent deformations per unit load, A1~An represent estimated loads (unknowns), and ε1~εn represent measured deformation data, (d) obtaining n measured deformation data of the structural body from the respective n positions while the structural body is operating, and (e) calculating estimated loads on the structural body from the obtained n measured deformation data according to the practical equations, whereby loads applied to the structural body at the respective n positions can be estimated in real-time.

According to a further aspect of the present invention, there is provided an apparatus for estimating loads applied to a structural body at respective n positions thereon, comprising n deformation measuring elements mounted on the structural body respectively at the n positions, for measuring deformations developed in the structural body at the respective n positions when a concentrated reference load is applied to the structural body at one of the n positions, and a processor for dividing the measured deformations by the concentrated reference load to produce deformations per unit load and repeatedly measuring deformations developed in the structural body at the respective n positions when concentrated reference loads are applied to the structural body at all of the n positions to generate practical equations given below:

$$\kappa 11 \cdot A1 + \kappa 12 \cdot A2 \cdots + \kappa 1n \cdot An = \varepsilon 1$$

$$\kappa 21 \cdot A1 + \kappa 22 \cdot A2 \cdots + \kappa 2n \cdot An = \varepsilon 2$$

$$\vdots$$

$$\kappa n1 \cdot A1 + \kappa n2 \cdot A2 \cdots + \kappa nn \cdot An = \varepsilon n$$

where κ11~κnn represent deformations per unit load, A1~An represent estimated loads (unknowns), and ε1~εn represent measured deformation data, and for obtaining n measured deformation data from the deformation measuring elements while the structural body is in operation, and calculating estimated loads from the collected n measured deformation data according to the practical equations, whereby loads applied to the structural body at the respective n positions can be estimated in real-time.

The deformations may be strains or flexures.

With the above arrangement of the present invention, it is possible to estimate the applied loads with high accuracy simply by solving the simultaneous equations for the loads. No high-speed computers are required unlike conventional processes which have required high-speed computers for performing a large amount of repetitive calculations, but have produced estimated loads with relatively low accuracy.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1A:
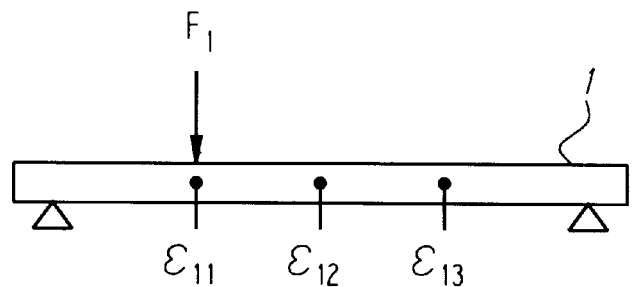
FIGS. 1(a) through 1(c) are views of sample models illustrative of the principles of a method of estimating loads imposed on a structural body according to the present invention.
Figure 1B:
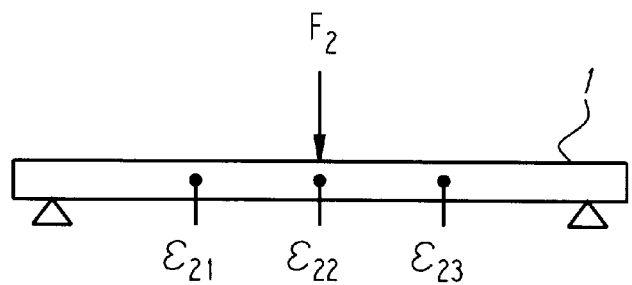
Figure 1C:
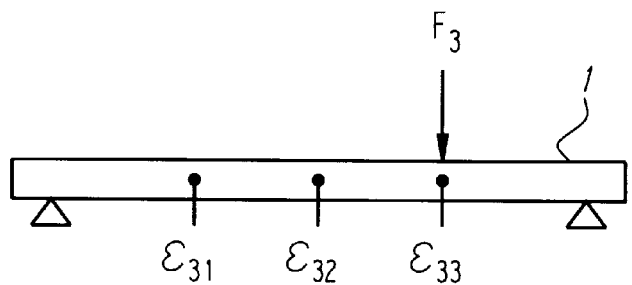

FIGS. 1(a) through 1(c) show sample models illustrative of the principles of a method of estimating loads imposed on a structural body according to the present invention. As shown in FIGS. 1(a) through 1(c), strains of a beam-like structural body 1 which are developed when three reference loads F1~F3 are applied individually to the structural body 1 at respective suitably spaced positions are measured. Each of the reference loads F1~F3 comprises a concentrated load. The structural body 1 is supported at its opposite ends by supports.

More specifically, in FIG. 1(a), only the reference load F1 is applied to the structural body 1 at a leftmost one of the three positions, and the structural body 1 develops strains ε11, ε12, ε13 respectively at the three positions.

In FIG. 1(b), only the reference load F2 is applied to the structural body 1 at a central one of the three positions, and the structural body 1 develops strains ε21, ε22, ε23 respectively at the three positions.

In FIG. 1(c), only the reference load F3 is applied to the structural body 1 at a rightmost one of the three positions, and the structural body 1 develops strains ε31, ε32, ε33 respectively at the three positions.

Figure 2:
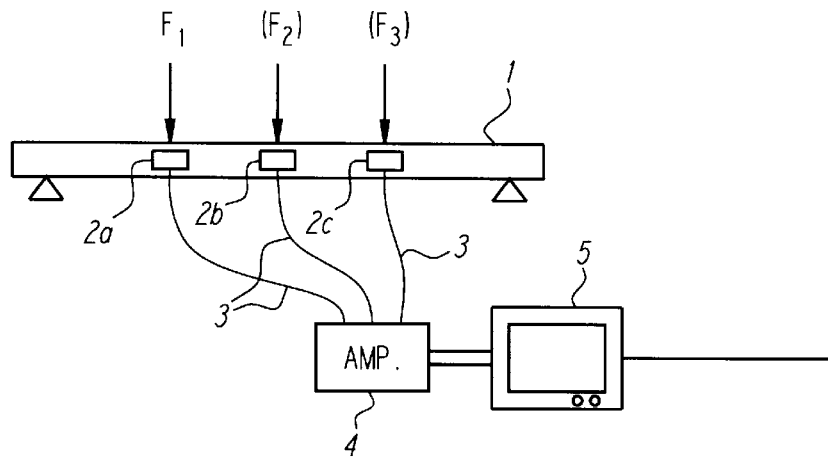
FIG. 2 is a diagram illustrative of a first stage of the method according to the present invention.

The developed strains are measured as follows:

FIG. 2 is illustrative of a first stage of the method according to the present invention. As shown in FIG. 2, strain gages 2a, 2b, 2c are attached respectively to the positions of the structural body 1 where loads are applied to the structural body 1, and electrically connected to an amplifier 4 through cables 3. The amplifier 4 is connected to a recorder 5 having an A/D converter, which is connected to a computer 6.

The structural body 1 may comprise, for example, a major aircraft structural body such as a main wing, a fuselage, a tailplane, or the like, or a major automobile structural body such as an automobile frame or the like.

In an experiment, an aluminum beam having a square cross section whose dimensions are 10 mm×10 mm was used as the structural body 1, and loads were applied to the aluminum beam at respective positions spaced ¼ (200 mm) of the span successively from a left one of the supports that support the ends of the aluminum beam.

Each of the strain gages 2a, 2b, 2c comprises a known Wheatstone bridge or piezoelectric element for generating an electric signal representative of the magnitude of the developed strain.

The load F1 of a known value is applied to the structural body 1 at the position of the strain gage 2a, and the developed strains ε11, ε12, ε13 are measured. The load F2 of a known value is applied to the structural body 1 at the position of the strain gage 2b, and the developed strains ε21, $\epsilon 22$, $\epsilon 23$ are measured. The load F3 of a known value is applied to the structural body 1 at the position of the strain gage 2c, and the developed strains $\epsilon 31$, $\epsilon 32$, $\epsilon 33$ are measured.

Table 1 below sets forth the measured values of the strains $\epsilon 11$, $\epsilon 12$, $\epsilon 13$ when the reference load F1 was applied. The reference load F1 had four values of 0 g, 800 g, 1600 g, and 2100 g.

TABLE 1

| F1 | $\epsilon 11$ | $\epsilon 12$ | $\epsilon 13$ |
| --- | --- | --- | --- |
| 0 g | 0 | 0 | 0 |
| 800 g | $112 \times 10^{-6}$ | $77 \times 10^{-6}$ | $37 \times 10^{-6}$ |
| 1600 g | $226 \times 10^{-6}$ | $153 \times 10^{-6}$ | $73 \times 10^{-6}$ |
| 2100 g | $304 \times 10^{-6}$ | $204 \times 10^{-6}$ | $97 \times 10^{-6}$ |

As shown in Table 1 above, the strain $\epsilon 11$ had four measured values of 0, $112 \times 10^{-6}$, $226 \times 10^{-6}$, $304 \times 10^{-6}$.

Figure 6:
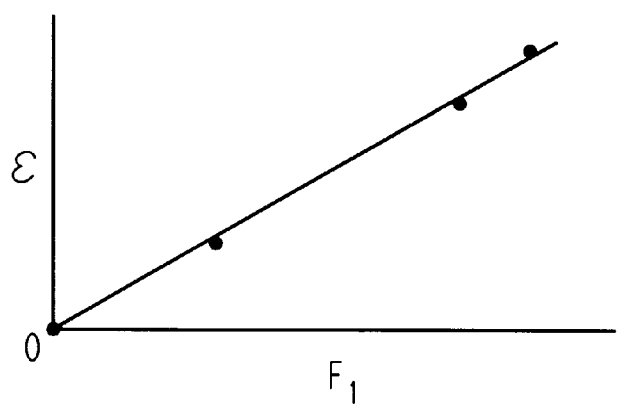
FIG. 6 is a graph of measured values of strain versus reference loads according to the present invention.

Then, the combinations of the values of the reference load F1 and the measured values of strain $\epsilon 11$, i.e., (0, 0), (800, $112 \times 10^{-6}$), (1600, $226 \times 10^{-6}$), and (2100, $304 \times 10^{-6}$), were plotted in a graph, shown in FIG. 6, having a horizontal axis representing F1 and a vertical axis $\epsilon$.

From these plotted points, an approximating equation $\epsilon$=The gradient of the approximating equation corresponds to a strain per unit load. The method of least squares was used to determine the approximating equation with high accuracy from the measured values.

The gradient of the above approximating equation, i.e., the strain per unit load, is represented by $\kappa 11$ in Table 2 shown below.

TABLE 2

| f1 | $\kappa 11$ | $\kappa 12$ | $\kappa 13$ |
| --- | --- | --- | --- |
| 1 | 0.1432 | 0.0966 | 0.0460 |

In Table 2, the values of $\kappa 11$, $\kappa 12$, $\kappa 13$ are expressed in terms of $10^{-6}$/g.

Similarly, a strain $\kappa 12$ per unit load was determined from the four measured values of the strain $\epsilon 12$ in Table 1 using a graph similar to the above graph, and a strain $\kappa 13$ per unit load was determined from the four measured values of the strain $\epsilon 13$ in Table 1 using a graph similar to the above graph. These strains $\kappa 11$, $\kappa 12$, $\kappa 13$ were tabulated in Table 2 above.

Likewise, measured values of the strains $\epsilon 21$, $\epsilon 22$, $\epsilon 23$ when the reference load F2 was applied were tabulated in Table 3, shown below, and strains $\kappa 21$, $\kappa 22$, $\kappa 23$ were tabulated in Table 4, shown below.

TABLE 3

| F2 | $\epsilon 21$ | $\epsilon 22$ | $\epsilon 23$ |
| --- | --- | --- | --- |
| 0 g | 0 | 0 | 0 |
| 800 g | $77 \times 10^{-6}$ | $155 \times 10^{-6}$ | $77 \times 10^{-6}$ |
| 1600 g | $151 \times 10^{-6}$ | $306 \times 10^{-6}$ | $155 \times 10^{-6}$ |
| 2100 g | $206 \times 10^{-6}$ | $412 \times 10^{-6}$ | $205 \times 10^{-6}$ |

TABLE 4

| f2 | $\kappa 21$ | $\kappa 22$ | $\kappa 23$ |
| --- | --- | --- | --- |
| 1 | 0.0967 | 0.1943 | 0.0973 |

In Table 4, the values of $\kappa 21$, $\kappa 22$, $\kappa 23$ are expressed in terms of $10^{-6}$/g.

Likewise, measured values of the strains $\epsilon 31$, $\epsilon 32$, $\epsilon 33$ when the reference load F3 was applied were tabulated in Table 5, shown below, and strains $\kappa 31$, $\kappa 32$, $\kappa 33$ were tabulated in Table 6, shown below.

TABLE 5

| F3 | $\epsilon 31$ | $\epsilon 32$ | $\epsilon 33$ |
| --- | --- | --- | --- |
| 0 g | 0 | 0 | 0 |
| 800 g | $35 \times 10^{-6}$ | $75 \times 10^{-6}$ | $114 \times 10^{-6}$ |
| 1600 g | $73 \times 10^{-6}$ | $153 \times 10^{-6}$ | $228 \times 10^{-6}$ |
| 2100 g | $98 \times 10^{-6}$ | $202 \times 10^{-6}$ | $305 \times 10^{-6}$ |

TABLE 6

| f3 | $\kappa 31$ | $\kappa 32$ | $\kappa 33$ |
| --- | --- | --- | --- |
| 1 | 0.0461 | 0.0958 | 0.1441 |

In Table 6, the values of $\kappa 31$, $\kappa 32$, $\kappa 33$ are expressed in terms of $10^{-6}$/g.

From the above data, the following simultaneous equations with three unknowns are derived:

$$\kappa 11 \cdot A1 + \kappa 12 \cdot A2 + \kappa 13 \cdot A3 = \epsilon 1 \quad (1)$$

$$\kappa 21 \cdot A1 + \kappa 22 \cdot A2 + \kappa 23 \cdot A3 = \epsilon 2 \quad (2)$$

$$\kappa 31 \cdot A1 + \kappa 32 \cdot A2 + \kappa 33 \cdot A3 = \epsilon 3 \quad (3)$$

where $\kappa 11 \sim \kappa 33$ represent strains per unit load, A1, A2, A3 represent estimated loads (unknown), and $\epsilon 1$, $\epsilon 2$, $\epsilon 3$ represent measured strain data.

The values of $\kappa 11$, $\kappa 12$, $\kappa 13$ in Table 2 are substituted in the equation (1), the values of $\kappa 21$, $\kappa 22$, $\kappa 23$ in Table 4 are substituted in the equation (2), and the values of $\kappa 31$, $\kappa 32$, $\kappa 33$ in Table 6 are substituted in the equation (3). Both sides of the equations are multiplied by 106 to eliminate $10^{-6}$ from the terms of $\kappa 11 \sim \kappa 33$. As a result, the following equations are obtained:

$$0.1432 A1 + 0.0966 A2 + 0.0460 A3 = \epsilon 1 \times 10^{-6} \quad (4)$$

$$0.0967 A1 + 0.1943 A2 + 0.0973 A3 = \epsilon 2 \times 10^{-6} \quad (5)$$

$$0.0461 A1 + 0.0958 A2 + 0.1441 A3 = \epsilon 3 \times 10^{-6} \quad (6)$$

These equations (4)~(6) are used as practical equations in the method according to the present invention.

The manner in which the practical equations (4)~(6) are used will be described below.

Figure 3:
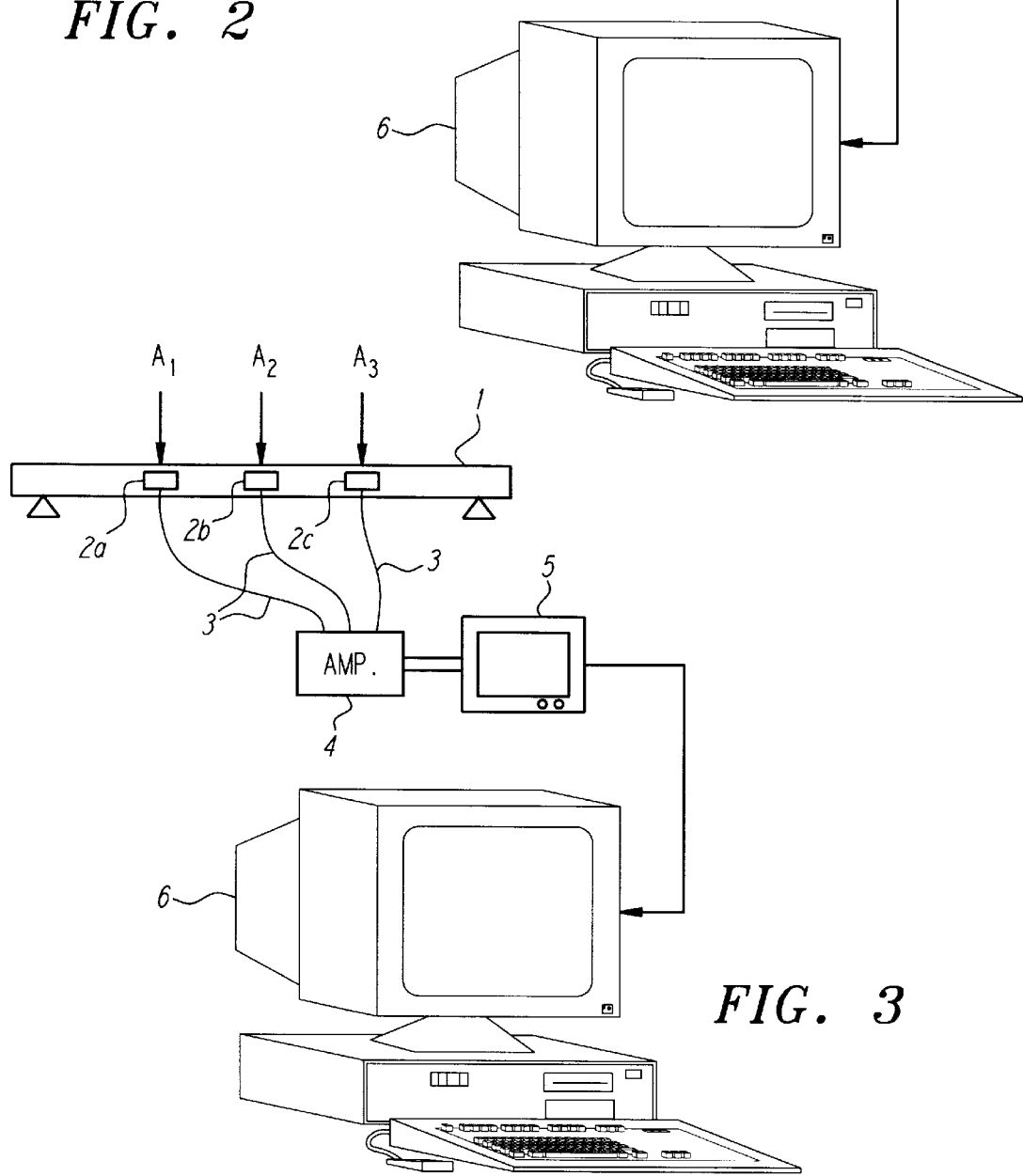
FIG. 3 is a diagram illustrative of a second stage of the method according to the present invention.

FIG. 3 is illustrative of a second stage of the method according to the present invention. The components used in the second stage are the same as those used in the first stage shown in FIG. 2.

Loads A1=800 g, A2=2100 g, and A3=1500 g were applied to the structural body 1 at the respective positions where the strain gages 2a~2c are attached.

Strains developed at the respective positions of the structural body 1 were measured by the strain gages 2a 2c. The strain measured by the strain gage 2a was $386\times10^{-6}$, the strain measured by the strain gage 2b was $627\times10^{-6}$, and the strain measured by the strain gage 2c was $456\times10^{-6}$. These strain readings serve as the measured strain data $\epsilon 1\sim\epsilon 3$ in the practical equations (4)~(6). By substituting the strain readings in the right-hand sides of the practical equations (4)~(6), the following equations are obtained:

$$0.1432A1+0.0966A2+0.046OA3=386 \quad (7)$$

$$0.0967A1+0.1943A2+0.0973A3=386 \quad (8)$$

$$0.0461A1+0.0958A2+0.1441A3=456 \quad (9)$$

These equations (7)~(9) were solved for the loads A1, A2, A3. As a result, the estimated load A1 was 819 g, the estimated load A2 was 2047 g, and the estimated load A3 was 1541 g, which are substantially the same as the applied loads A1, A2, and A3, respectively.

Consequently, it was possible to estimate the applied loads A1~A3 by measuring the strains $\epsilon 1\sim\epsilon 3$ developed in the structural body 1.

The above equations may be expressed using matrices as follows:

$$\begin{bmatrix} K_{11} & i & K_{1h} \\ j & j & j \\ K_{nl} & i & K_{nh} \end{bmatrix} \begin{Bmatrix} A_1 \\ j \\ A_n \end{Bmatrix} = \begin{Bmatrix} \epsilon_1 \\ j \\ \epsilon_n \end{Bmatrix}$$

$$([K]\{A\} = \{\epsilon\})$$

By calculating an inverse of the matrix [K] with the computer 6 connected to the strain gages 2a, 2b, 2c through the amplifier 4 and the recorder 5 immediately before strains are measured, it is possible to calculate loads in real-time from the measured strains according to the equation:

$$\{A\}=[K]^{-1}\{\epsilon\}$$

The accuracy of the estimated loads was analyzed. The estimated loads and the actual loads (A1=800 g, A2=2100 g, and A3=1500 g) were compared with each other, and errors were calculated. The calculated errors were 2.4% for the load A1, 2.4% for the load A2, and 2.7% for the load A3. It was confirmed, therefore, that the accuracy of the estimated loads was good.

Figure 4:
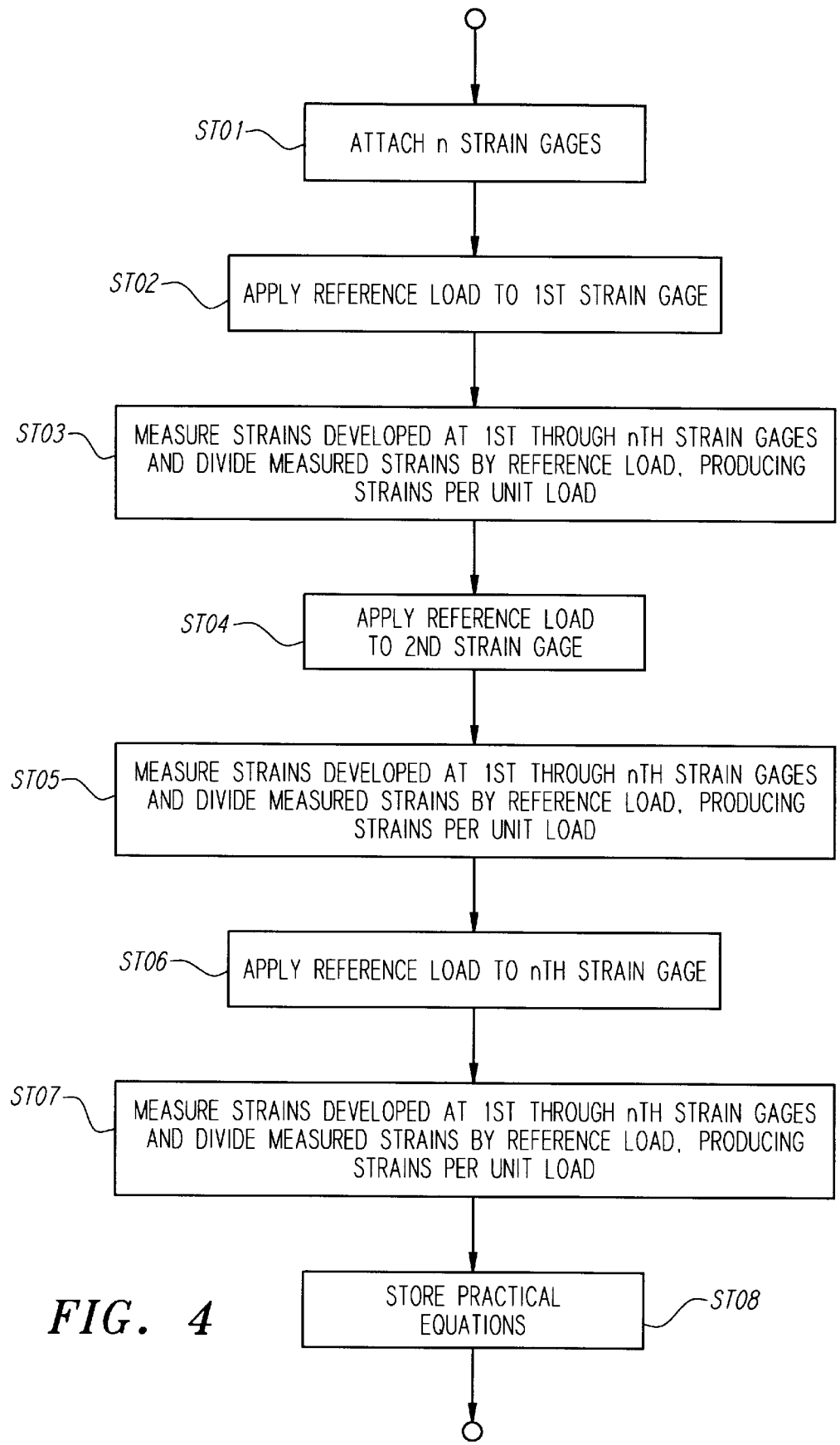
FIG. 4 is a flowchart of an operation sequence of the first stage of the method according to the present invention.

Steps of the first stage of the method according to the present invention will be described below with reference to FIG. 4. The first stage may be carried out in a well-equipped experimental facility.

An "n" number of strain gages are attached to a structural body in a step ST01. A concentrated load reference of 800 g, for example, is applied to the structural body at the position of the 1st strain gage in a step ST02. Strains developed in the structural body at the positions of the first through nth strain gages are measured, and the measured strains are divided by the reference load, producing strains per unit load in a step ST03. Then, a concentrated load reference of 800 g, for example, is applied to the structural body at the position of the 2nd strain gage in a step ST04. Strains developed in the structural body at the positions of the first through nth strain gages are measured, and the measured strains are divided by the reference load, producing strains per unit load in a step ST05. The steps of applying a reference load to the structural body, measuring developed strains, and producing strains per unit load are repeated until a concentrated load reference of 800 g, for example, is applied to the structural body at the position of the nth strain gage in a step ST06. Strains developed in the structural body at the positions of the first through nth strain gages are measured, and the measured strains are divided by the reference load, producing strains per unit load in a step ST07.

Practical simultaneous equations with n unknowns are stored in a step ST08.

Figure 5:
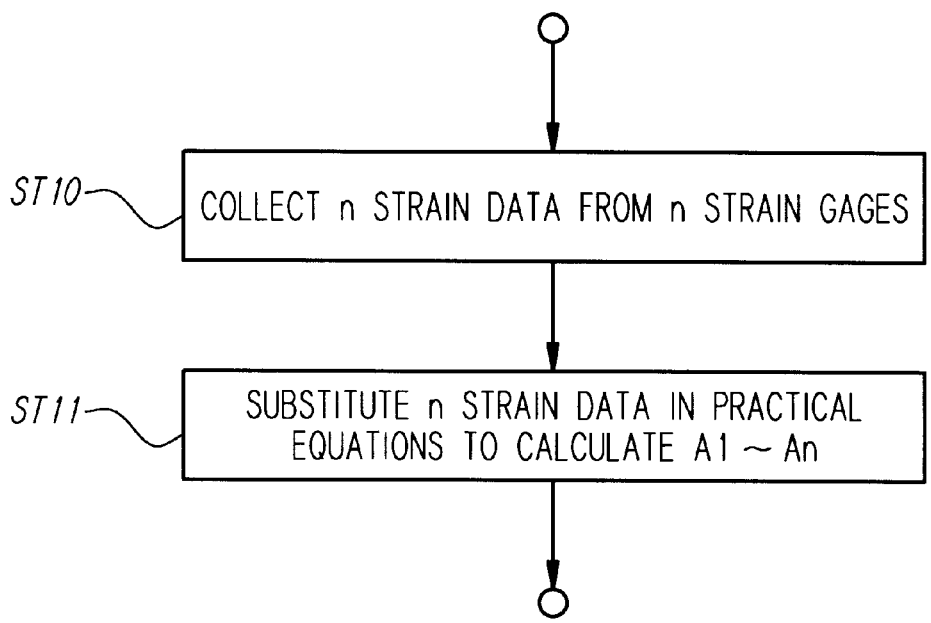
FIG. 5 is a flowchart of an operation sequence of the second stage of the method according to the present invention.

Steps of the second stage of the method according to the present invention will be described below with reference to FIG. 5. The second stage is carried out while the structural body is in operation, i.e., while the aircraft is in flight or the automobile is being driven.

The n strain data are collected from the n strain gages attached to the structural body in a step ST10. The collected n strain data are substituted in the practical simultaneous equations, and loads A1, A2, . . . , An are calculated. The calculated loads A1, A2, . . . , An are loads estimated that are assumed to be applied to the structural body 1 at the positions of the 1st through nth strain gages.

In the above embodiment, applied loads are estimated from developed strains, as measured by strain gages. However, applied loads may be estimated from developed flexures that may be measured by contact-type gages such as dial gages or non-contact-type gages such as pneumatic micrometers, optimeters, etc.

The method of least squares was used to determine the approximating equation with high accuracy from the measured values. However, a similar method may be used to determine the approximating equation.

In the illustrated embodiment, the method according to the present invention has been described as estimating loads applied to simple support beam. However, the method according to the present invention is capable of measuring dynamic loads applied to a structural body at multiple points. Specifically, the method according to the present invention is applicable to the estimation of loads applied to a wing of an aircraft while it is in test flight, and the estimation of fluid forces applied to a marine structural object, the hull of a ship, etc. Particularly, since no load cells are used, the method according to the present invention is suitable for estimating such fluid forces. Therefore, the method according to the present invention may be used to measure dynamic loads such as vibrations, shocks, etc. as well as static loads, and is capable of estimating loads in real-time to generate an overload signal with the aid of sensors and a processor that are installed on a structural body being tested.

Although a certain preferred embodiment of the present invention has been shown and described in detail, it should be understood that various changes and modifications may be made therein without departing from the scope of the appended claims.

What is claimed is:

1. A method of estimating loads applied to a structural body at respective n positions thereon, comprising the steps:

(a) installing a plurality of deformation measuring elements on the structural body respectively at the n positions;

(b) applying a concentrated reference load to the structural body at one of said n positions;

(c) measuring deformations developed in the structural body at the respective n positions when said concentrated reference load is applied to the structural body;

(d) dividing the measured deformations by said concentrated reference load to produce deformations per unit load;

(e) repeating said steps (b), (c), (d) for each of said n positions to generate practical equations given below:

$$\kappa 11 \cdot A1 + \kappa 12 \cdot A2 \cdots + \kappa 1n \cdot An = \varepsilon 1$$

$$\kappa 21 \cdot A1 + \kappa 22 \cdot A2 \cdots + \kappa 2n \cdot An = \varepsilon 2$$

$$\vdots$$

$$\kappa n1 \cdot A1 + \kappa n2 \cdot A2 \cdots + \kappa nn \cdot An = \varepsilon n$$

where κ11~κnn represent deformations per unit load, A1~An represent estimated loads (unknowns), and ε1~εn represent measured deformation data;

(f) collecting n measured deformation data from said deformation measuring elements while the structural body is in operation; and (g) calculating estimated loads from the collected n measured deformation data according to said practical equations, whereby loads applied to said structural body at the respective n positions can be estimated in real-time.

2. A method according to claim 1, wherein said deformations comprise strains.

3. A method according to claim 1, wherein said deformations comprise flexures.

4. A method of estimating a distribution of loads applied to a structural body at respective n positions thereon from n deformation data at said n positions, comprising the steps:

(a) applying reference loads successively to the structural body at the respective n positions;

(b) collecting deformation data from respective deformation measuring elements mounted on said structural body at the respective n positions each time one of said reference loads is applied to the structural body at one of the n positions;

(c) dividing the collected deformation data by said reference loads to produce deformation data per unit load to generate practical equations given below:

$$\kappa 11 \cdot A1 + \kappa 12 \cdot A2 \cdots + \kappa 1n \cdot An = \varepsilon 1$$

$$\kappa 21 \cdot A1 + \kappa 22 \cdot A2 \cdots + \kappa 2n \cdot An = \varepsilon 2$$

$$\vdots$$

$$\kappa n1 \cdot A1 + \kappa n2 \cdot A2 \cdots + \kappa nn \cdot An = \varepsilon n$$

where κ11~κnn represent deformations per unit load, A1~An represent estimated loads (unknowns), and ε1~εn represent measured deformation data;

(d) collecting n measured deformation data from said deformation measuring elements while the structural body is in operation; and (e) calculating estimated loads from the collected n measured deformation data according to said practical equations, whereby loads applied to said structural body at the respective n positions can be estimated in real-time.

5. A method according to claim 4, wherein said deformations comprise strains.

6. A method according to claim 4, wherein said deformations comprise flexures.

7. A method of estimating loads applied to a structural body, comprising the steps:

(a) applying reference loads successively to the structural body at n spaced positions thereon;

(b) obtaining deformation data of the structural body from the respective n positions each time one of said reference loads is applied to the structural body at one of the n positions;

(c) dividing the obtained deformation data by said reference loads to produce deformation data per unit load to generate practical equations given below:

$$\kappa 11 \cdot A1 + \kappa 12 \cdot A2 \cdots + \kappa 1n \cdot An = \varepsilon 1$$

$$\kappa 21 \cdot A1 + \kappa 22 \cdot A2 \cdots + \kappa 2n \cdot An = \varepsilon 2$$

$$\vdots$$

$$\kappa n1 \cdot A1 + \kappa n2 \cdot A2 \cdots + \kappa nn \cdot An = \varepsilon n$$

where κ11~κnn represent deformations per unit load, A1~An represent estimated loads (unknowns), and ε1~εn represent measured deformation data;

(d) obtaining n measured deformation data of said structural body from the respective n positions while the structural body is operating; and (e) calculating estimated loads on the structural body from the obtained n measured deformation data according to said practical equations, whereby loads applied to said structural body at the respective n positions can be estimated in real-time.

8. A method according to claim 7, wherein said deformations comprise strains.

9. A method according to claim 7, wherein said deformations comprise flexures.

10. An apparatus for estimating loads applied to a structural body at respective n positions thereon, comprising:

n deformation measuring elements mounted on the structural body respectively at the n positions, for measuring deformations developed in the structural body at the respective n positions when a concentrated reference load is applied to the structural body at one of said n positions; and a processor for dividing the measured deformations by said concentrated load reference to produce deformations per unit load and repeatedly measuring deformations developed in the structural body at the respective n positions when concentrated references load are applied to the structural body at all of said n positions to generate practical equations given below:

$$\kappa 11 \cdot A1 + \kappa 12 \cdot A2 \cdots + \kappa 1n \cdot An = \varepsilon 1$$

$$\kappa 21 \cdot A1 + \kappa 22 \cdot A2 \cdots + \kappa 2n \cdot An = \kappa 2$$

$$\vdots$$

$$\kappa n1 \cdot A1 + \kappa n2 \cdot A2 \cdots + \kappa nn \cdot An = \varepsilon n$$

where κ11~κnn represent deformations per unit load, A1~An represent estimated loads (unknowns), and ε1~εn represent measured deformation data, said processor obtaining n measured deformation data from said deformation measuring elements while the structural body is in operation and calculating estimated loads from the collected n measured deformation data according to said practical equations, whereby loads applied to said structural body at the respective n positions can be estimated in real-time.

11. An apparatus according to claim 10, wherein said deformation measuring elements are strain gages.

12. An apparatus according to claim 10, wherein said deformation measuring elements are flexure measuring gages.

* * * * *